3,134,646
PREPARATION OF LITHIUM PEROXIDE
Ricardo O. Bach, Gastonia, N.C., assignor to Lithium Corporation of America, Inc., New York, N.Y., a corporation of Minnesota
No Drawing. Filed Jan. 15, 1962, Ser. No. 166,395
10 Claims. (Cl. 23—184)

This invention relates to an improved method of producing substantially anhydrous lithium peroxide, and to the product produced thereby.

Methods for the production of substantially anhydrous lithium peroxide have long been known in the art. More recently, improvements in such methods have been proposed as disclosed, for instance, in U.S. Patents Nos. 2,448,485 and 2,962,358. However, each of the methods disclosed in these patents has certain significant disadvantages, particularly from an economic standpoint, which make their utilization in commercial operations open to practical difficulties. In U.S. Patent No. 2,448,485, for example, formation of the desired peroxide is accomplished in an organic liquid medium, for instance, n-propanol, and large quantities of the n-propanol are required to produce only a modest amount of the peroxide. More specifically, of the order of at least 20, and as high as 50 or more, parts of n-propanol are indicated to be utilized to prepare only 1 part of anhydrous lithium peroxide.

The second U.S. patent referred to hereinabove, like U.S. Patent 2,448,485, utilizes an organic liquid medium, specifically methanol, in the method of producing the anhydrous lithium peroxide. The quantities of solvent used in this patent are substantially the same as are required in the method disclosed in U.S. Patent 2,448,485, and, in addition, it calls for a substantial quantity of hydrogen peroxide to form the lithium peroxide, of the order of about 2½ times the theoretical amount, which increases significantly the raw material costs of the method.

Apart from the cost factors already mentioned, presently known methods of preparing anhydrous lithium peroxide, as exemplified by the U.S. patents previously discussed as well as others, have the further disadvantage of requiring substantial amounts of time to complete. In at least most instances, heating time is required to permit the reaction to go to completion, and even more time must be expended in separating the desired lithium peroxide from the organic liquid medium. These factors further militate against the usefulness of presently known processes so far as their commercial practicability is concerned.

It is an object of this invention to provide an improved method of producing substantially anhydrous lithium peroxide which is highly efficient and economical.

It is also an object of this invention to provide an improved method of producing substantially anhydrous lithium peroxide which is adaptable to a continuous operation, which can be completed in a fraction of the time required in conventional methods, and which does not require the utilization of organic liquids in the reaction of producing the lithium peroxide.

Other objects and advantages of the invention will become apparent as the description proceeds.

I have discovered that the objectives of this invention are achieved by forming an aqueous solution of lithium hydroxide (or a hydrate thereof such as lithium hydroxide monohydrate) and hydrogen peroxide, converting the solution to a state permitting ready and facile transfer of heat therethrough, and subjecting the solution while in this condition to heat to effect rapid removal of the water and conversion of said solution to substantially anhydrous lithium peroxide. The rapid drying step serves not only to effect the removal of water added through the water solutions of the reactants and, additionally, formed in the course of the reaction, but serves, also, and quite surprisingly, to bring about the important function of effecting rapid transfer of the active oxygen of the hydrogen peroxide to the lithium hydroxide to consummate formation of the desired lithium peroxide.

The lithium hydroxide (which term also includes lithium hydroxide hydrates such as lithium hydroxide monohydrate) is most advantageously used in the form of a strong to substantially saturated aqueous solution, for instance, from about 8 or 10 to 12% concentration. In those instances where the resulting lithium hydroxide solutions contain insoluble impurities as, for instance, lithium carbonate, it is desirable to filter the solutions to remove said impurities so as to bring about greater purity of the final substantially anhydrous lithium peroxide.

The aqueous hydrogen peroxide component of the solutions may vary considerably in strength. Good results may be attained with aqueous hydrogen peroxide of strength of from 20% to 40%, or more, with especially desirable results being attained with 27 to 35% aqueous hydrogen peroxide.

The proportions of the lithium hydroxide and the hydrogen peroxide, present in the aqueous solutions used in the practice of the method of this invention, can be varied within appreciable limits. The generally optimum objectives of the invention, however, are most advantageously achieved with approximately stoichiometric or theoretical proportions of the lithium hydroxide and the hydrogen peroxide, namely, a lithium hydroxide to hydrogen peroxide molar ratio of about 2:1, with especially desirable results being obtained when the hydrogen peroxide component is used in slight excess, or in a molar ratio of lithium hydroxide to hydrogen peroxide of the order of 2 of the lithium hydroxide to about 1.05 to 1.25 of the hydrogen peroxide.

To obtain the desired anhydrous lithium peroxide, the solution is subjected to a mechanical operation whereby the surface area of the solution is increased in order to enhance the transfer of heat therethrough to effect rapid consummation of the formation of the lithium peroxide and the rapid removal of the water from the reaction mixture to convert the lithium peroxide to a substantially anhydrous product. While this may be achieved through the use of liquid film rapid evaporation techniques, it is most importantly achieved by spray drying.

Atomization or nebulization or fine subdivision of the liquid reaction mixture in a typical spray dryer having utility for the purposes of this invention may be accomplished in any of numerous ways. Generally speaking, a nozzle of the orifice or impingement type is employed. The reaction mixture, under pressure, is injected into a gas stream, also under pressure, and passed through an orifice which acts to break up the solution into a multitude of droplets. An impingement surface such as a baffle may be used to achieve further reduction in size of the particles or droplets. Hot gases directed into the apparatus, or more desirably, steam heated coils positioned within the spray drying apparatus, may be utilized as the source of heat necessary to attain the desired results. The temperature within the heating chamber may be controlled in any manner known in the art.

The conditions under which the spray drying and conversion operation is carried out are subject to variation. Runs have been made with good results at pump pressures ranging from 2500 to 5000 p.s.i.g. and air rates of from 3550 to 4850 standard cubic feet per minute, as illustrated in Examples 1 and 2. The temperatures employed are maintained at levels which will avoid thermal decomposition of the lithium peroxide. Hence, temperatures materially in excess of about 315° C. should be avoided for best results. It is particularly desirable, in the spray drier-conversion operation, to employ inlet temperatures ranging from about 200° to 280° or 300° C., and outlet temperatures of from about 80° to 175° C., with especially desirable results being obtained with an inlet temperature of from 230° to 270° C. and an outlet temperature of from 90° to 150° C. The temperature at which the dried product is discharged from the drying chamber of the apparatus is not critical and may range from 40° C. to 100° C., and in the usual operation ranges from about 50° to 75° C.

The purity of the end product, particularly with respect to its lithium carbonate content, can be advantageously enhanced by utilizing substantially carbon dioxide free air in carrying out the spray drying-conversion operation. Lithium peroxide rapidly absorbs carbon dioxide. It has been found that utilization of a spray dryer employing air which is indirectly heated produces a product of reduced lithium carbonate content. It has further been found that pretreatment of the drying air, prior to its introduction into the spray dryer, by subjecting it to contact with a carbon dioxide absorbing agent such as "Mikohbite" (G. F. Smith Company) or with an absorption column containing a solution of potassium hydroxide, results in the production of a substantially anhydrous lithium peroxide product with sharply reduced contents of lithium carbonate, for instance, of the order of 1 to 2% or even less. Substantially anhydrous lithium peroxide products are readily obtained pursuant to my invention with active oxygen contents of 30 to 31% and, under very carefully controlled conditions, up to about 33%, and with contents of lithium peroxide in the range of 90 to 95% or more.

The substantially anhydrous lithium peroxide products made in accordance with my invention have physical and other characteristics which make them readily distinguishable from the anhydrous lithium peroxide products obtained by heretofore known procedures. The nature of the anhydrous particles of the lithium peroxide products of this invention is, generally, hollow spherical as opposed to the irregular solid structure of the products produced by the methods heretofore used. Moreover, the products of the present invention have an excess of active oxygen over the alkali values present in said products. In this connection, it may be pointed out that the substantially anhydrous lithium peroxide products of this invention, as removed from the spray dryer, have a small content of what appeared to be lithium hydroxide. When efforts were made to effect removal of such lithium hydroxide from the spray dried lithium peroxide products by extraction with methanol, it was found, most surprisingly, that hardly any of the supposed lithium hydroxide could so be extracted. This was in sharp contrast to the situation with respect to the anhydrous lithium peroxide products produced pursuant to the procedures of the above-mentioned patents from which the lithium hydroxide is readily extractable by means of methanol. The exact nature of the supposed lithium hydroxide content of the substantially anhydrous lithium peroxide products of my invention has not been determined but it is postulated that said supposed lithium hydroxide is actually a hydrated lithium oxide, $LiO_2 \cdot H_2O$. I have discovered, further, that the spray dried lithium peroxide products of my invention can be so treated as to reduce very substantially their content of said postulated hydrated lithium oxide. This is achieved by heating said spray dried lithium peroxide products in an inert atmosphere, for instance, nitrogen, argon or helium, at temperatures up to about 200° C., which apparently serves to split up the hydrated lithium oxide to lithium hydroxide and lithium peroxide. After such heat treatment, the thus formed lithium hydroxide is readily leachable by means of various organic solvents, such as methanol, in which lithium hydroxide is soluble and in which lithium peroxide is insoluble. This technique can, if desired, be employed to remove the lithium oxide hydrate content of the spray dried lithium peroxide products produced in accordance with my invention and thereby to upgrade them should this be desired.

The exact composition of the final substantially anhydrous lithium peroxide product made in accordance with my invention will vary, dependent upon a number of facts, as indicated above, and as more particularly pointed out below. The content of lithium oxide hydrate increases with increasing outlet temperature from the sprayer dryer up to about 110° C. and then decreased with higher outlet temperatures. The lithium peroxide content of the final spray dried product decreases from 80° to 120° C. outlet temperature and then increases with higher outlet temperatures. Generally speaking, it is desired to operate at outlet temperatures somewhat below 150° C.

From an overall standpoint, my present invention possesses the combination of advantages, in relation to prior procedures, of permitting the utilization of low molar ratios of hydrogen peroxide to lithium hydroxide, the use of water as a solvent medium and the avoidance of the use of organic liquids or solvents such as ethanol, methanol and propanol in the reaction between the lithium hydroxide and the hydrogen peroxide, the avoidance of heating and distilling operations prior to the drying step, the avoidance of washing steps with organic solvents, and the very substantial saving in time in carrying out the method.

The following examples are illustrative of the practice of my invention. It will be understood that various changes may be made therein as, for example, proportions and concentrations of the reactants, by changing the rate of feed, amount of pressure, temperature, and the like, without departing from the spirit of the invention in the light of the teaching herein.

*Example I*

To 100 gallons of water, 150 pounds of lithium hydroxide monohydrate are added. The solution is filtered to remove insolubles. Following filtration, 23.5 gallons of 27.5% hydrogen peroxide are incorporated into the solution, resulting in a single phase, homogeneous liquid solution which is then passed through a spray dryer, employing a pressure-nozzle atomization, under the following conditions:

| | |
|---|---|
| Pump pressure (p.s.i.g.) | 3000 |
| Feed rate (g.p.h.) | 100 |
| Air rate (s.c.f.m.) | 4000 |
| Inlet temperature, ° C | 230 |
| Outlet temperature, ° C | 120 |
| Conveying temperature, ° C | 65 |
| Retention time, seconds | 3.5 |

Heating is accomplished by direct combustion of natural gas. The solids upon analysis show about 9% lithium carbonate and 29.65% active oxygen, the dry product containing about 85% lithium peroxide.

*Example II*

A feed solution comprising a mixture of 75 pounds of lithium hydroxide monohydrate dissolved in 75 gallons of water (which solution is filtered) and 10 gallons of 35% hydrogen peroxide, are introduced into a spray dryer employing a centrifugal disk atomization device. The solution is dried with steam coil heated air. The conditions of the run are as follows:

| | |
|---|---|
| Pump pressure (p.s.i.g.) | 3500 |
| Feed rate (g.p.h.) | 10 |
| Air rate (s.c.f.m.) | 4200 |
| Inlet temperature, ° C | 260 |
| Outlet temperature, ° C | 115 |
| Conveying temperature, ° C | 70 |
| Retention time, seconds | 20 |

The solids upon analysis show 8.0% lithium carbonate and 31% active oxygen, the final dry product containing about 86% lithium peroxide.

*Example III*

27.5% aqueous peroxide is admixed with a stoichiometric amount (plus 1% excess) of a filtered 10% aqueous solution of lithium hydroxide monohydrate and spray dried, utilizing air from which substantially all of the carbon dioxide has previously been removed. The spray drying conditions are otherwise like those described in Example I. The resulting spray dried product is heated at 180° C. for about one-half hour and then allowed to cool to room temperature. It is then extracted with methanol and dried in vacuo at 95° C. The final substantially anhydrous lithium peroxide product has an active oxygen content of about 32% and contains about 94% lithium peroxide.

While I have described the invention in detail, it will be understood that various modifications may be made in the light of the teachings hereof without departing from the spirit and scope of my invention as pointed out in the claims.

What I claim as new and desire to protect by Letters Patent of the United States is:

1. A method of producing substantially anhydrous lithium peroxide comprising forming a water solution of hydrogen peroxide and lithium hydroxide in approximately stoichiometric proportions to produce lithium peroxide, nebulizing the water solution to permit rapid transfer of heat therethrough, and subjecting the thus nebulized water solution to heat rapidly to effect drying of the solution and transfer of the active oxygen of the hydrogen peroxide to the lithium hydroxide to form the lithium peroxide.

2. A method of producing substantially anhydrous lithium peroxide comprising forming a water solution of hydrogen peroxide and lithium hydroxide in approximately stoichiometric proportions to produce lithium peroxide, atomizing the water solution to increase the surface area thereof to permit rapid transfer of heat therethrough, and subjecting the thus atomized solution to heat rapidly to effect drying of the solution and transfer of the active oxygen of the hydrogen peroxide to the lithium hydroxide to form the lithium peroxide.

3. A method of producing substantially anhydrous lithium peroxide comprising forming water solution of hydrogen peroxide and lithium hydroxide in approximately stoichiometric proportions to produce lithium peroxide, and applying a thin film of the solution to a heated surface rapidly to effect drying of the solution and transfer of the active oxygen of the hydrogen peroxide to the lithium hydroxide to form the lithium peroxide.

4. A method of producing substantially anhydrous lithium peroxide comprising forming a water solution of hydrogen peroxide and lithium hydroxide in approximately stoichiometric proportions to produce lithium peroxide, and spray drying the solution to remove water therefrom and to effect transfer of the active oxygen of the hydrogen peroxide to the lithium hydroxide to form the lithium peroxide.

5. A method of producing substantially anhydrous lithium peroxide comprising forming a water solution of hydrogen peroxide and lithium hydroxide in approximately stoichiometric proportions to produce lithium peroxide, and spray drying the solution in the substantial absence of carbon dioxide to remove water therefrom and to effect transfer of the active oxygen of the hydrogen peroxide to the lithium hydroxide to form the lithium peroxide.

6. A method of producing substantially anhydrous lithium peroxide comprising forming an 8 to 12% water solution of lithium hydroxide and 27 to 35% hydrogen peroxide in slight excess over stoichiometric proportions to produce lithium peroxide, and spray drying the solution in the substantial absence of carbon dioxide to remove water therefrom and to effect transfer of the active oxygen of the hydrogen peroxide to the lithium hydroxide to form the lithium peroxide.

7. A method of producing substantially anhydrous lithium peroxide comprising forming a water solution of hydrogen peroxide and lithium hydroxide monohydrate in approximately stoichiometric proportions to produce lithium peroxide, and spray drying the solution in the substantial absence of carbon dioxide to remove water therefrom and to effect transfer of the active oxygen of the hydrogen peroxide to the lithium hydroxide to form the lithium peroxide.

8. A method of producing substantially anhydrous lithium peroxide which comprises mixing together an 8 to 12% water solution of lithium hydroxide with an amount of 27 to 35% aqueous hydrogen peroxide slightly in excess of the stoichiometric amount necessary to react with the lithium hydroxide to produce lithium peroxide, and then spray drying the resulting mixture in the substantial absence of carbon dioxide rapidly to effect drying of the water solution and transfer of the active oxygen of the hydrogen peroxide to the lithium hydroxide to form the lithium peroxide under such conditions that the air inlet temperature in the spray dryer is in the range of 200 to 300° C. and the air outlet temperature is in the range of 80 to 150° C.

9. The method of claim 2, including the step of heating the substantially anhydrous lithium peroxide at an elevated temperature below 200° C., and extracting unreacted lithium hydroxide therefrom by means of an organic solvent in which lithium hydroxide is soluble and in which lithium peroxide is insoluble.

10. A method of producing substantially anhydrous lithium peroxide comprising forming a strong water solution of hydrogen peroxide and lithium hydroxide in approximately stoichiometric proportions to produce lithium peroxide, introducing the solution at a temperature of from about 200 to 300° C. into a spray dryer to effect drying of the solution and transfer of the active oxygen of the hydrogen peroxide to the lithium hydroxide to form lithium peroxide, removing the dried product from the dryer at a temeprature of from 80 to 150° C., heating the dried product at an elevated temperature below 200° C., and extracting unreacted lithium hydroxide therefrom by means of an organic solvent in which lithium hydroxide is soluble and in which lithium peroxide is insoluble.

References Cited in the file of this patent

UNITED STATES PATENTS

| | | |
|---|---|---|
| 1,546,922 | Faber | July 21, 1925 |
| 1,601,898 | Wiley et al. | Oct. 5, 1926 |
| 1,670,711 | Bryan et al. | May 22, 1928 |
| 1,853,682 | Hechenbleikner | Apr. 12, 1932 |
| 2,413,644 | Nicholson | Dec. 31, 1946 |
| 2,671,010 | Governale | Mar. 2, 1954 |
| 2,962,358 | Strater | Nov. 29, 1960 |

OTHER REFERENCES

Ser. No. 379,872, Ebner (A.P.C.), published April 27, 1943.